US012325169B2

(12) United States Patent
Cottais

(10) Patent No.: US 12,325,169 B2
(45) Date of Patent: Jun. 10, 2025

(54) COMPLEX FORMING DEVICE FOR PRODUCING A COMPLEX PRODUCT FROM NON-PROTRUDING RUBBER LAYERS

(71) Applicant: COMPAGNIE GENERALE DES ETABLISSEMENTS MICHELIN, Clermont-Ferrand (FR)

(72) Inventor: Frederic Cottais, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 226 days.

(21) Appl. No.: 18/035,658

(22) PCT Filed: Oct. 29, 2021

(86) PCT No.: PCT/EP2021/080092
§ 371 (c)(1),
(2) Date: May 5, 2023

(87) PCT Pub. No.: WO2022/096384
PCT Pub. Date: May 12, 2022

(65) Prior Publication Data
US 2023/0405907 A1 Dec. 21, 2023

(30) Foreign Application Priority Data

Nov. 6, 2020 (FR) ........................................ 2011400

(51) Int. Cl.
*B29C 48/12* (2019.01)
*B29C 48/00* (2019.01)
(Continued)

(52) U.S. Cl.
CPC ........ *B29C 48/468* (2019.02); *B29C 48/0022* (2019.02); *B29C 48/022* (2019.02);
(Continued)

(58) Field of Classification Search
None
See application file for complete search history.

(56) References Cited

U.S. PATENT DOCUMENTS

| 3,308,510 A | 3/1967 | Gabbrielli |
| 4,128,342 A | 12/1978 | Renk |

(Continued)

FOREIGN PATENT DOCUMENTS

| DE | 1229179 B | 11/1966 | |
| EP | 1343624 A2 * | 2/2003 | ............. B29C 48/08 |

(Continued)

OTHER PUBLICATIONS

International Search Report dated Feb. 4, 2022, in corresponding PCT/EP2021/080092 (2 pages).

*Primary Examiner* — Yung-Sheng M Tsui
(74) *Attorney, Agent, or Firm* — VENABLE LLP

(57) ABSTRACT

A device (100) for forming a complex product of a profiled product produces a complex product from non-protruding rubber layers. There is also a process for forming a complex product of a profiled product from non-protruding rubber layers, performed by the disclosed device (100). A tire production line can include at least one installation (500) having the device (100).

10 Claims, 4 Drawing Sheets

(51) Int. Cl.
  *B29C 48/465* (2019.01)
  *B29K 21/00* (2006.01)
  *B29L 30/00* (2006.01)

(52) U.S. Cl.
  CPC .......... *B29C 48/12* (2019.02); *B29K 2021/00* (2013.01); *B29L 2030/002* (2013.01)

(56) References Cited

U.S. PATENT DOCUMENTS

| | | |
|---|---|---|
| 4,253,771 A | 3/1981 | Renk |
| 7,052,267 B2 | 5/2006 | Lamoine et al. |
| 11,440,235 B2 | 9/2022 | Rouby et al. |
| 2004/0009255 A1 | 1/2004 | Lamoine et al. |
| 2020/0114565 A1 | 4/2020 | Rouby et al. |

FOREIGN PATENT DOCUMENTS

| | | | |
|---|---|---|---|
| EP | 1343624 B1 | 11/2006 | |
| FR | 2287830 A7 | 5/1976 | |
| WO | WO-2019002782 A1 * | 1/2019 | ........... B29C 48/025 |

* cited by examiner

COMPLEX FORMING DEVICE FOR PRODUCING A COMPLEX PRODUCT FROM NON-PROTRUDING RUBBER LAYERS

TECHNICAL FIELD

The invention generally relates to the production of complex products prepared from one or more rubber mixtures. More particularly, the invention relates to a complex forming device that allows the passage of blades in order to produce complex rubber products from non-protruding rubber layers.

BACKGROUND

In the field of production of products prepared from a rubber mixture (including tires), use is made of devices for making a profiled product based on a rubber mixture in the form of a very thin strip. The strip made may be very wide and may be deposited directly on a known device (including a tire building drum, or "drum"), or directly superposed at the outlet of the device upon another material (for example, one or more plies or layers already deposited on the drum).

One solution that is used (disclosed by the Applicant's European patent EP1343624) includes placing a very thin layer of a rubber product between the products to be adhesively bonded (this layer is sometimes referred to as a "connecting rubber"). With reference to FIGS. 1 and 2, an extrusion device 10 includes a rotating roller (or "roller") 12 that rotates about its axis X-X', having an outer surface 12a. The extrusion device 10 also includes a vault 14 with a wall 16 extending between a transverse end (hidden by the roller 12), where an inlet orifice is defined, and an opposite transverse end 16a, where an extrusion orifice is defined when the extrusion device 10 is closed. The extrusion orifice is delimited by the outer surface 12a of the roller 12 and an extrusion plate (or "plate") 18 arranged towards the opposite transverse end 16a of the vault 14. The wall 16, which partially circumferentially covers at least part of the outer surface 12a of the roller 12, includes an inner surface 16b with projecting threads 16c oriented towards the roller 12 and separating consecutive sectors 16d. Thus, the roller 12 and the wall 16 delimit a gap between them that forms a chamber for plasticizing the rubber mixture from which the thin strip is formed.

During production, a rubber mixture is subjected to considerable stresses. With reference to FIG. 2, in one mode of use of the extrusion device 10, the roller 12 arranged relative to the vault 14 rotates in a predetermined direction (see the arrow A in FIG. 2) depending upon a direction of travel of a substrate on which the strip at the outlet of the extrusion device will be placed (see the arrow B in FIG. 2). The rubber mixture introduced via the inlet orifice will follow a path as represented by the strip M. The rubber mixture introduced passes into the gap $E_{10}$ defined between the inner surface 16b of the wall 16 and the outer surface 12a of the roller 12. The rubber mixture passes the projecting threads 16c where significant shearing forces are created. Therefore, sometimes the material close to the roller continues to stick to the roller and passes by the projecting threads, which can result in particles of rubber in the strip formed therefrom (for example, in the case where the projecting threads are not uniform).

A rubber layer generated at the end of this process is cut directly on the roller 12 after the application of a rubber complex. For example, FIG. 3 shows a sectional view of a sample of a tread 50 made up of the assembled semi-finished products of a rubber complex. The tread 50 shown includes a layer 52 designed for wear and gripping the road, a profiled inner lining (or "sub-layer") 54 and a joint-cover profile 56 for protection against lateral impacts (other types of assembly are of course known). If the sub-layer 54 is protruding, it may be on the outside of the tire casing, thus giving rise to cracks in the sidewall of the tire over its lifetime. Therefore, to reduce the generation of protruding rubber layers, the blades that make the cut must pass under the rubber complex.

The disclosed invention thus proposes a complex forming device that ensures the passage of blades under the rubber complex so that non-protruding rubber layers are obtained.

SUMMARY OF THE INVENTION

The invention relates to a device for forming a profiled product so as to produce a complex product from non-protruding rubber layers, in which the device includes an extrusion device for forming the profiled product based on a rubber mixture, the extrusion device having a rotating roller, an inlet orifice allowing the rubber mixture to flow and a vault circumferentially covering at least part of an outer surface of the roller, the vault having a wall bearing, on its inner surface oriented towards the roller, projecting threads so as to delimit with the surface of the roller a chamber for plasticizing the rubber mixture, the rubber mixture being driven from the inlet orifice towards an extrusion orifice in a gap defining the profile of the product, delimited by the wall of the vault and the outer surface of the roller, the roller including a pair of shoulders of predetermined equal diameter, with a shoulder in correspondence with each of the two transverse ends of the vault, where the inlet orifice and the extrusion orifice are located, respectively, and with an outer flange and an inner flange being mounted on the two shoulders, characterized in that the device includes:

at least one pair of blades separated by a predetermined distance between them relative to edges of the profiled product;

an additional roller that allows the blades of the device to pass under the profiled product, the additional roller having a rotating roller that rotates about its axis, having a substantially circumferential outer surface and having a center through which an axis of rotation of the additional roller is defined, the additional roller extending axially between two opposite ends that define a predetermined length of the additional roller; and one or more supports that support the additional roller in such a way as to allow the additional roller to rotate about its axis of rotation;

such that the blades cut a product emerging from the extrusion device of the device so as to cut a precise width of the profiled product in order to direct the profiled product towards the additional roller so that it is assembled in a complex form from non-protruding rubber layers.

In some embodiments of the device, the supports are integrated with the corresponding flanges, and the additional roller includes a separate part that is detachably secured to the supports.

In some embodiments of the device, the additional roller and the supports are integrated in a single part such that the assembly incorporating the additional roller and the supports is detachably secured to the extrusion device of the device.

In some embodiments of the device, the device further includes a securing means that secures the assembly incorporating the additional roller and the supports to the extrusion device of the device.

In some embodiments of the device, at least one part among the additional roller, the supports and the securing means is supplied as a kit incorporating parts having different parameters.

The invention also relates to a process for forming a complex product of a profiled product from non-protruding rubber layers, produced by the disclosed device, including the following steps:
- a step of introducing the rubber mixture into the extrusion device of the device via the inlet orifice of the extrusion device;
- a step of conveying the incoming mixture into the gap between the outer surface of the roller and the inner surface of the wall of the vault, this step being performed by the roller as it rotates;
- a step in which the mixture passes as far as the extrusion orifice of the extrusion device of the device, where the mixture emerges from the extrusion device in the form of a profiled product;
- a transfer step, in which the profiled product emerging from the extrusion device of the device is directed towards the roller;
- a step of cutting the profiled product, which is performed by the blades, in which the profiled product is cut to a width corresponding to the gap separating the blades; and
- a step of transferring the cut profiled product towards the additional roller, which maintains the profiled product at a predefined tension so as to receive one or more other rubber layers of a complex product having a corresponding width.

The invention also relates to a tire production line, including at least one installation having the disclosed device.

In some embodiments of the production line, the installation includes a frame on which the roller is mounted and rotated by a motor at a predetermined speed.

In some embodiments of the production line, the production line further includes at least one extruder in which a mixture emerging from the extruder is directed towards the inlet orifice of the extrusion device of the device.

In some embodiments of the production line, the production line further includes an extruder for extruding several rubber mixtures and at least two devices arranged downstream.

Further aspects of the invention will become obvious from the following detailed description.

BRIEF DESCRIPTION OF THE DRAWINGS

The nature and various advantages of the invention will become more evident from reading the following detailed description, and from studying the attached drawings, in all of which the same reference numerals denote identical parts, and in which.

DETAILED DESCRIPTION

Figure 4:
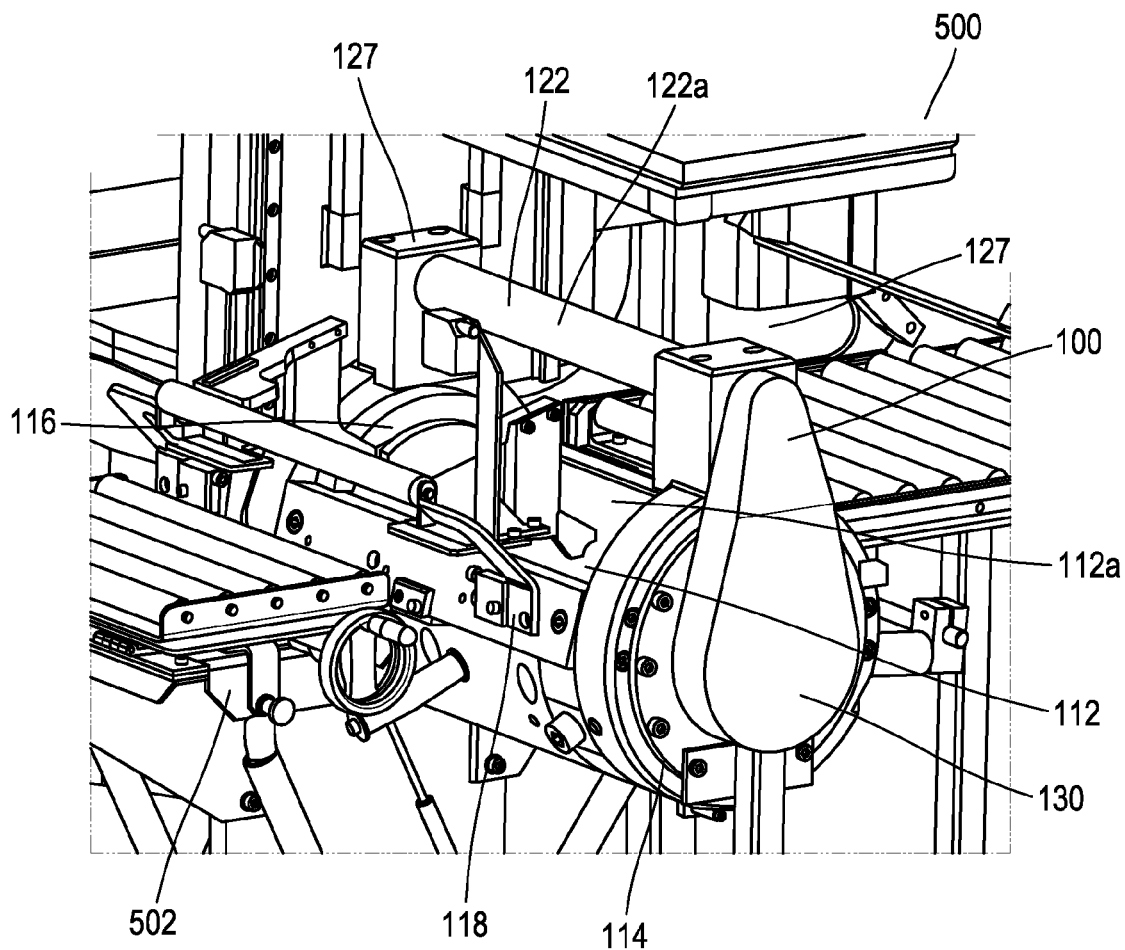
FIG. 4 shows a perspective view of an embodiment of a complex forming device of the invention installed in an installation of a tire production line.
Figure 5:
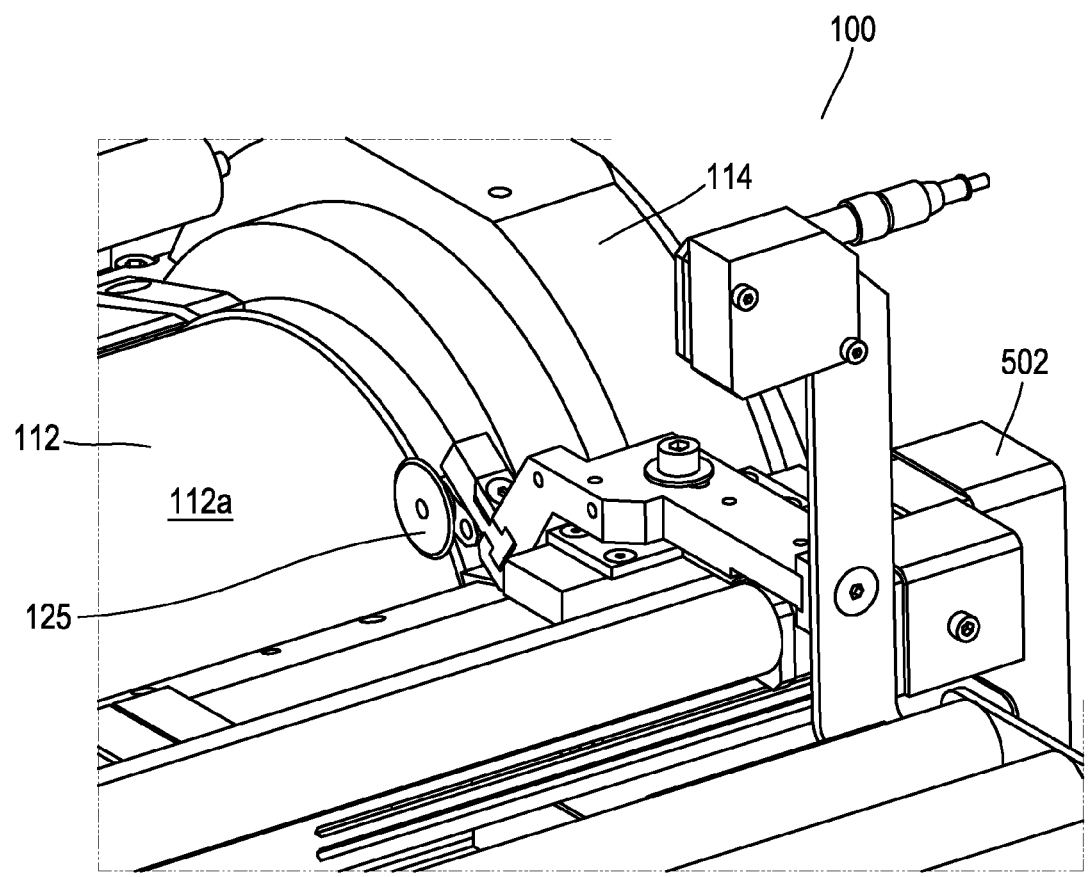
FIG. 5 shows a partial perspective view of an embodiment of the complex forming device of FIG. 4.
Figure 6:
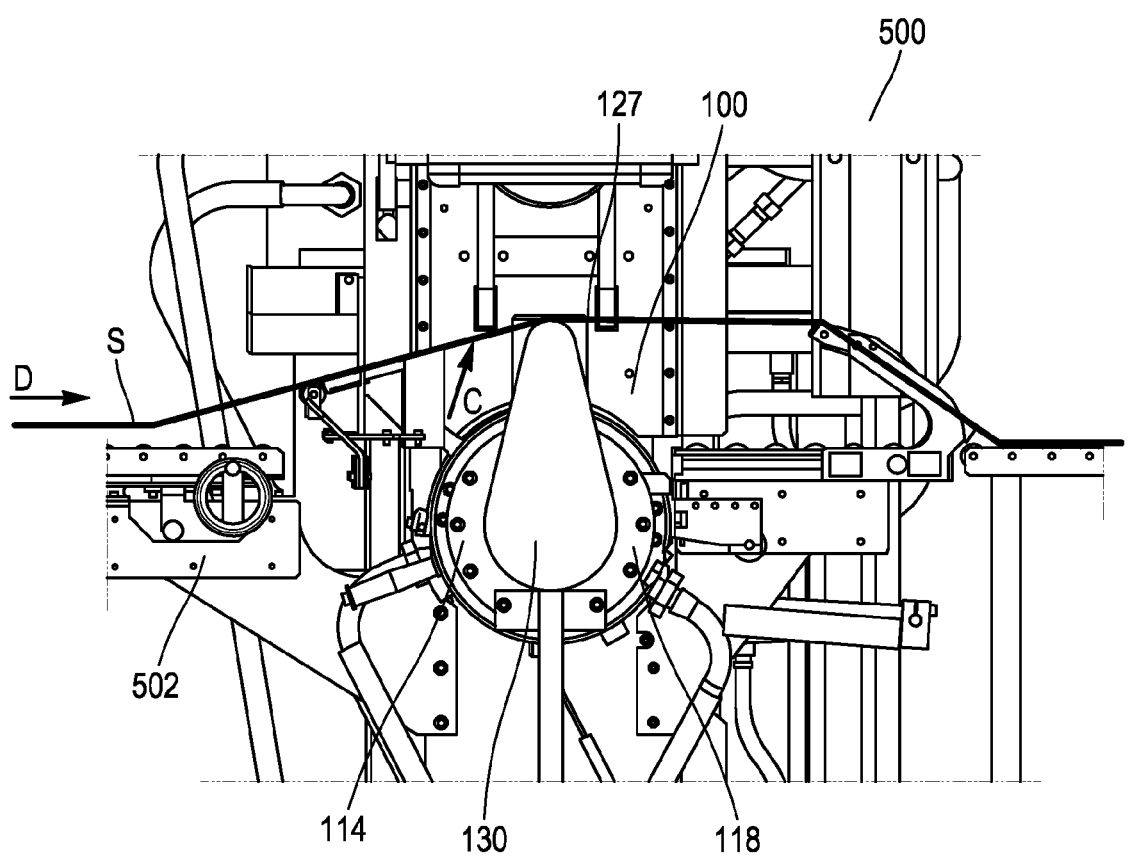
FIG. 6 shows a perspective side view of an embodiment of the complex forming device of FIGS. 4 and 5 during a process for forming a complex product.

Referring now to the figures, in which the same numbers identify identical elements, FIGS. 4, 5 and 6 show an embodiment of a complex forming device (or "device") 100 for producing a complex product from rubber layers (or "products"). A profiled product at the outlet from the device 100 can be combined with at least one other rubber product so as to produce a product referred to as "complex". The device 100 may form part of an installation 500 of a tire production line.

It is understood that a rubber mixture (or "mixture") introduced into the device 100 may include all materials necessary for producing the rubber product (or "product"), including, without limitation, an elastomer (for example, a natural rubber, a synthetic elastomer and combinations and equivalents thereof) and one or more ingredients, such as one or more processing agents, protective agents and reinforcing fillers. The materials may also include one or more other ingredients such as carbon black, silica, oils, resins and crosslinking or vulcanization agents. During mixing of the rubber mixture, all ingredients are introduced in variable quantities depending on the performance desired from the products obtained by the mixing processes (for example, the tires).

Figure 1:
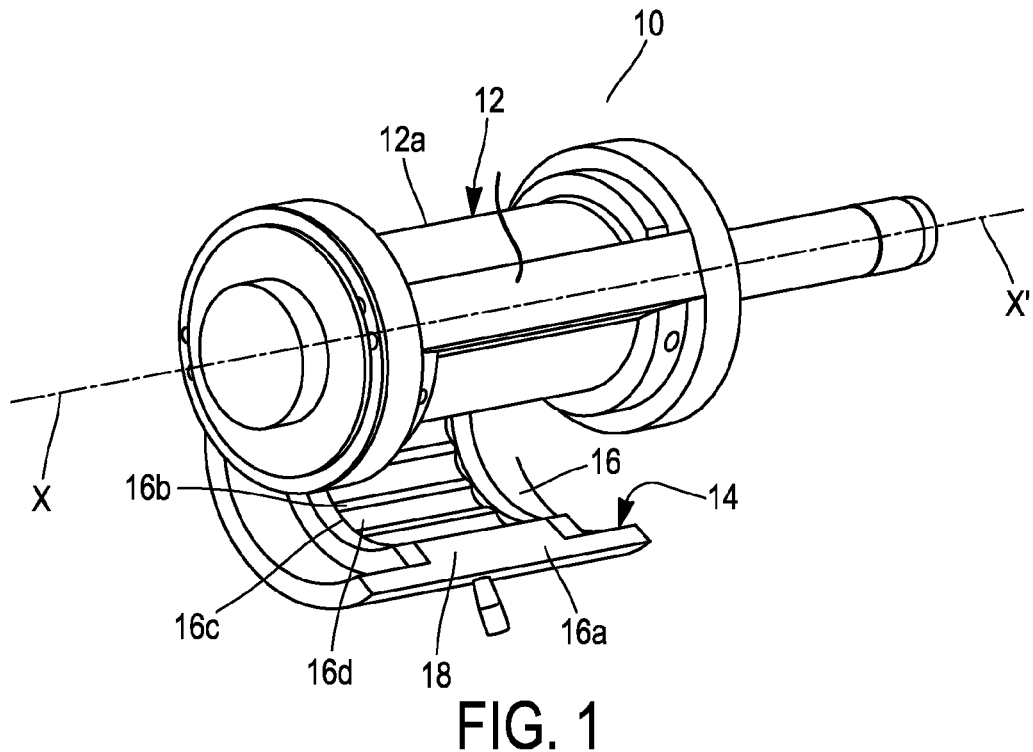
FIG. 1 shows a perspective view of a prior art extrusion device for producing a profiled product based on a rubber mixture.
Figure 2:
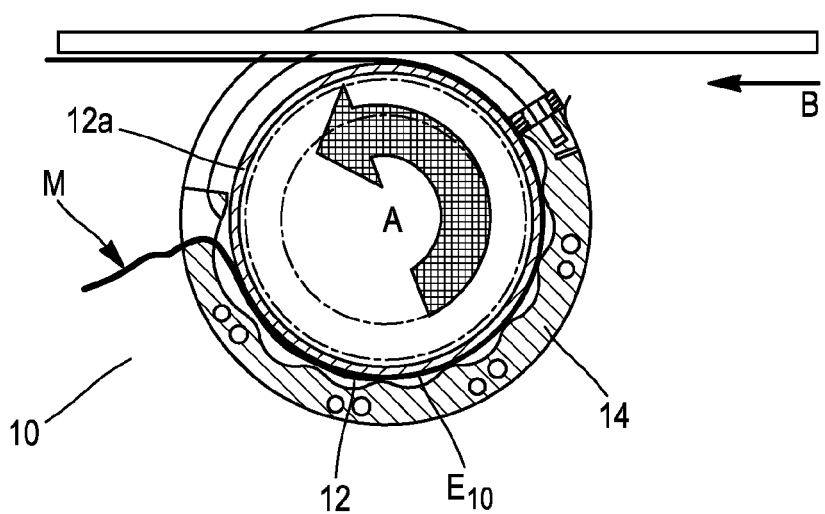
FIG. 2 shows a schematic view of an embodiment of the extrusion device of FIG. 1.

With reference to FIGS. 4 and 5, the device 100 includes an extrusion device incorporating elements that are identical to the extrusion device 10 shown in FIGS. 1 and 2 and disclosed by the Applicant's patent EP1343624B1. The extrusion device has a rotating roller (or "roller") 112 with a substantially circumferential outer surface 112*a*. The roller 112 has a center through which an axis of rotation of the roller is defined. The roller 112, which extends axially between two opposite ends, rotates about its axis of rotation relative to a shaft (not shown) that supports the roller. The roller 112 and the shaft may be integrated or they may be supplied as two separate parts. The roller 112 also includes a pair of shoulders (not shown) of predetermined equal diameter.

A vault of the extrusion device includes a wall that circumferentially covers at least part of an outer surface 112*a* of the roller 112. The wall includes an inner surface with projecting threads oriented towards the roller. As understood by a person skilled in the art, the inner surface of the wall has a substantially circumferential profile so as to direct a flow of the rubber mixture into a gap delimited between it and the outer surface 112*a* of the roller 112, which serves as a chamber for plasticizing the mixture. At the two transverse ends of the vault, corresponding to the shoulders of the roller 112, an inlet orifice and an opposite extrusion orifice are located, respectively. During a process for forming the mixture, the mixture is driven from the inlet orifice, into the gap located between the wall of the vault and the outer surface 112*a* of the roller 112, towards the extrusion orifice.

It is understood that the vault is not divided into sectors but has at least two projecting threads extending substantially axially from the wall ("axial threads"). These two axial threads guide the mixture towards the extrusion orifice, distributing it over the width of the extrusion orifice. Other projecting threads on the vault may be oriented ("oriented threads") in different directions, such as helical threads or convergent or divergent threads, relative to the axial threads.

An outer flange 114 and an opposite inner flange 116 are mounted on the two shoulders. Each flange axially bears internally a shoulder that interacts respectively with a corresponding end of the vault. This allows the vault to be secured by one or more known securing means (for example, one or more screws or one or more equivalent means).

As can be seen in FIGS. 4 and 6, support elements 118 are mounted between the flanges 114, 116, respectively, the support elements being offset circumferentially relative to the roller 112. The support elements 118 are rigidly secured to the flanges 114, 116 by any suitable means (such as screws or equivalent securing means). It is understood that the flanges 114, 116 and the support elements 118 may be made in one piece.

The roller 112 may be mounted on a frame 502 of the installation 500 and rotated by a motor at a predetermined speed. The exact position of the roller 112 relative to the frame 502 is adjustable according to the properties of the mixture and the strip formed (its width and its thickness).

It is understood that an extrusion plate (or "plate"), of the type described above in relation to the extrusion device 10 of FIGS. 1 and 2, is arranged internally on the support element 118 in such a way that it delimits, with the outer surface 112a of the roller 112, the extrusion orifice. It is thus possible to adjust the spacing between the plate and the outer surface 112a of the roller 112 so as to define the height of the extrusion orifice according to the profile of the strip of rubber product to be obtained (for example, a thin strip). The plate may include one or more holes for the passage of textile yarns or metal wires so as to produce a reinforced strip that may be placed directly on a building drum or form.

The roller 112 incorporates a means for controlling the temperature inside the roller, this means including, for example, a network of one or more known conveying channels (not shown) passing through the roller. Thus, a corresponding regulating fluid (such as water, steam, a gas or another known temperature regulating fluid) or electricity is conveyed under the outer surface 112a of the roller 112 so as to regulate the temperature of the mixture during the process for forming the mixture.

Figure 3:
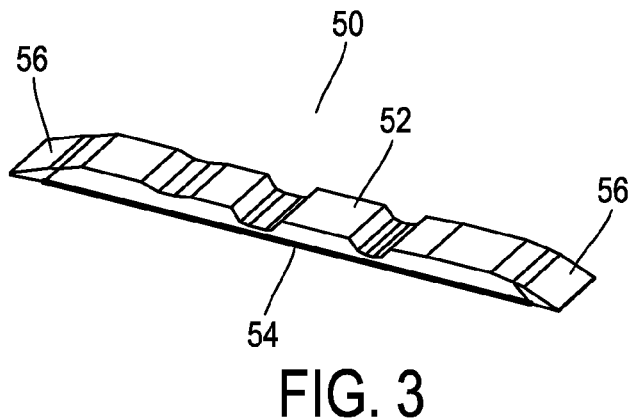
FIG. 3 shows a perspective view of a sample of a tire made up of the complex products.

Still with reference to FIGS. 4 and 5, and also to FIG. 6, the device 100 further includes an additional roller 122 that allows the passage of at least one pair of blades 125 of the device under the complex product (in other words, the profiled product) during production (in the embodiment of the device 100 shown in FIG. 5, a single blade 125 is arranged beside the outer flange 114, but it is understood that a second blade is arranged beside the inner flange 116). The blades 125 of the device 100 are separated by a predetermined distance from the outer surface 112a of the roller 112. This distance corresponds to a desired width depending on the rubber product profile to be obtained (for example, a profiled inner lining 54 as shown in FIG. 3). The two blades 125 may be positioned automatically relative to edges of the profiled product to create this distance. The blades 125 cut the product emerging from the extrusion device of the device 100 so as to cut a precise width of the cut product (see the arrow C in FIG. 6). The cut product is directed from the roller 112 towards the additional roller 122 so as to be assembled with other layers of a complex product having a corresponding width. In this configuration, the device 100 assembles the rubber products in a complex form from non-protruding rubber layers.

The additional roller 122 includes a rotating roller that rotates about its axis, having a substantially circumferential outer surface 122a. The additional roller 122 has a center through which an axis of rotation of the roller is defined. The additional roller 122 extends axially between two opposite ends that define a predetermined length of the additional roller. The additional roller 122 rotates about its axis of rotation relative to one or more supports 127 that support the additional roller.

The additional roller 122 and the support or supports 127 may be integrated or they may be supplied as two separate parts. In one embodiment of the device 100, the supports 127 may be integrated with the corresponding flanges 114, 116, and the additional roller 122 may be supplied as a separate, replaceable part. For example, an additional roller of predetermined diameter may be replaced by an additional roller of another diameter depending on the selected rubber mixture recipe.

In one embodiment of the device 100, the additional roller 122 and the support or supports 127 may be integrated such that the whole assembly can be replaceable. In this embodiment, the assembly including the additional roller 122 and the supports 127 is detachably secured, allowing the assembly to be secured to and removed from the roller 112. The assembly including the additional roller 122 and the supports 127 may be secured using a securing means 130 that secures the assembly to the outer flange 114. It is understood that the additional roller 122, the supports 127 and the securing means 130 may be supplied as one or more kits incorporating parts having different parameters (for example, additional rollers having different diameters and/or different lengths depending on the selected mixture recipe, supports 127 having diameters corresponding to the diameters of the additional rollers and/or different heights for adjusting the height of the additional roller relative to the roller 112).

Still with reference to FIG. 6, during a complex forming process performed by the device 100, a rubber mixture is introduced into the extrusion device of the device 100 via the inlet orifice of the extrusion device. As it continues to rotate, the roller 112 conveys the mixture entering in the peripheral direction into the gap between the outer surface 112a of the roller and the inner surface of the wall of the vault. As the mixture passes through, a shearing energy is conferred on the mixture, raising its temperature. The rubber mixture continues to pass through as far as the extrusion orifice of the extrusion device of the device 100, where the plasticized rubber mixture is taken by the plate so as to subsequently emerge from the extrusion device in the form of a profiled rubber product (for example, a thin strip corresponding to an inner lining).

The profiled product emerging from the extrusion device of the device 100 is directed towards the roller 112 that rotates in a direction depending on a direction of travel of a substrate S on which the strip will be placed at the outlet of the extrusion device (see the arrow D in FIG. 6). As it passes by the blades 125, the profiled product is cut by these blades to a width corresponding to the gap separating them. The profiled product, now cut, is then directed towards the additional roller 122, which maintains the profiled product at a predefined tension so as to receive one or more other layers of a complex product having a corresponding width. It is understood that the device 100 (or an installation 500 incorporating the device 100) may be arranged at the outlet of at least one extruder such that a mixture emerging from the extruder is directed towards the inlet orifice of the extrusion device of the device 100. It is also understood that the device (100) (or an installation (500) incorporating the device (100)) may be incorporated in a production line with an extruder for extruding several rubber mixtures and at least two devices (100) arranged downstream so as to allow several products to be deposited successively in order to obtain the desired complex product. For each embodiment of such a production line, the blades make a cut that passes under the rubber layers so as to reduce the generation of protruding rubber layers.

For all embodiments of the device (100), a monitoring system could be installed. At least one part of the monitoring system may be supplied in a portable device such as a mobile network device (for example a mobile telephone, a laptop computer, a camera, one or more portable devices connected to the network (including "augmented reality" and/or "virtual reality" devices, portable clothing connected to the network and/or any combinations and/or any equivalents)).

In embodiments of the invention, the device (100) (and/or an installation (500) incorporating the device (100)) may receive voice commands or other audio data (representing, for example, a start or stop of the process for forming the mixture). The request may include a request for the current state of a process for forming the rubber mixture. A response generated can be represented audibly, visually, in a tactile manner (for example by way of a haptic interface) and/or in a virtual and/or augmented manner In one embodiment, the process for forming the mixture, performed by the device (100) of the invention, may include a step of training the device (100) (or of training an installation (500) incorporating the device (100)) to recognize values representative of the thin strip (for example, values of length, width and thickness relative to particles detected and removed) and to compare them with expected values. This step may include the step of training the device (100) to recognize a lack of equivalence between the compared values. Each training step may include a classification generated by self-learning means. This classification may include, without limitation, the parameters of the selected rubber mixture recipe, the durations of the process for forming the mixture and the expected values during an ongoing cycle of tire production. The data obtained may be fed into one or more neural networks that manage the device (100) and/or one or more installations (500) incorporating the device (100).

The terms "at least one" and "one or more" are used interchangeably. The ranges given as lying "between a and b" encompass the values "a" and "b".

Although particular embodiments of the disclosed device have been illustrated and described, it will be appreciated that various changes, additions and modifications can be made without departing from either the spirit or scope of the present description. Therefore, no limitation should be imposed on the scope of the invention described, apart from those set out in the appended claims.

The invention claimed is:

1. A device (100) for forming a profiled product so as to produce a complex product from non-protruding rubber layers, in which the device comprises an extrusion device for forming the profiled product based on a rubber mixture, the extrusion device comprising a rotating roller (112), an inlet orifice allowing the rubber mixture to flow, and a vault circumferentially covering at least part of an outer surface (112a) of the roller (112), the vault having a wall bearing, on its inner surface oriented towards the roller (112), projecting threads so as to delimit with the surface of the roller a chamber for plasticizing the rubber mixture, the rubber mixture being driven from the inlet orifice towards an extrusion orifice into a gap defining a profile of the product, delimited by the wall of the vault and the outer surface of the roller, the roller (112) comprising a pair of shoulders of predetermined equal diameter, with a shoulder in correspondence with each of the two transverse ends of the vault, where the inlet orifice and the extrusion orifice are located, respectively, and with an outer flange (114) and an inner flange (116) being mounted on the two shoulders, wherein the device (100) further comprises:
at least one pair of blades (125) separated by a predetermined distance between the blades relative to edges of the profiled product;
an additional roller (122) that allows the blades (125) of the device to pass under the profiled product, the additional roller (122) comprising a rotating roller that rotates about its axis, having a substantially circumferential outer surface (122a) and having a center through which an axis of rotation of the roller is defined, the additional roller (122) extending axially between two opposite ends that define a predetermined length of the additional roller; and
one or more supports (127) that support the additional roller (122) in such a way as to allow the additional roller (122) to rotate about its axis of rotation, and wherein the blades (125) cut a product emerging from the extrusion device so as to cut a precise width of the profiled product in order to direct the profiled product towards the additional roller (122) so that it is assembled in a complex form from non-protruding rubber layers.

2. The device (100) of claim 1, wherein the one or more supports (127) are integrated with corresponding flanges (114, 116), and the additional roller (122) includes a separate part that is detachably secured to the one or more supports (127).

3. The device (100) of claim 1, wherein the additional roller (122) and the one or more supports (127) are integrated in a single part such that the assembly incorporating the additional roller (122) and the one or more supports (127) is detachably secured to the extrusion device.

4. The device (100) of claim 3, further comprising a securing means (130) that secures the assembly incorporating the additional roller (122) and the one or more supports (127) to the extrusion device.

5. The device (100) of claim 4, wherein at least one part out of the additional roller (122), the one or more supports (127) and the securing means (130) is supplied as a kit incorporating parts having different parameters.

6. A process for forming a complex product of a profiled product from non-protruding rubber layers, produced by the device (100) of claim 1, comprising the following steps:
a step of introducing the rubber mixture into the extrusion device via the inlet orifice of the extrusion device;
a step of conveying the incoming mixture into the gap between the outer surface (112a) of the roller (112) and the inner surface of the wall of the vault, this step being performed by the roller (112) as it rotates;
a step in which the mixture passes as far as the extrusion orifice of the extrusion device, where the mixture emerges from the extrusion device in the form of a profiled product;
a transfer step, in which the profiled product emerging from the extrusion device is directed towards the roller (112);

a step of cutting the profiled product, which is performed by the blades (125), in which the profiled product is cut to a width corresponding to the gap separating the blades; and a step of transferring the cut profiled product towards the additional roller (122), which maintains the profiled product at a predefined tension so as to receive one or more other rubber layers of a complex product having a corresponding width.

7. A tire production line comprising at least one installation (500) comprising the device (100) of claim 1.

8. The tire production line of claim 7, wherein the installation (500) comprises a frame (502) on which the roller (112) is mounted and rotated by a motor at a predetermined speed.

9. The tire production line of claim 7, further comprising at least one extruder in which a mixture emerging from the extruder is directed towards the inlet orifice of the extrusion device.

10. A tire production line comprising at least one installation (500) comprising an extruder for extruding several rubber mixtures and at least two devices (100) of claim 1 arranged downstream.

\* \* \* \* \*